(12) United States Patent
Shimamura et al.

(10) Patent No.: US 10,938,677 B2
(45) Date of Patent: *Mar. 2, 2021

(54) VIRTUALIZED NETWORK FUNCTIONS AND SERVICE CHAINING IN SERVERLESS COMPUTING INFRASTRUCTURE

(71) Applicant: Cisco Technology, Inc., San Jose, CA (US)

(72) Inventors: Komei Shimamura, London (GB); Amit Kumar Saha, Bangalore (IN); Debojyoti Dutta, Santa Clara, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 90 days.

This patent is subject to a terminal disclaimer.

(21) Appl. No.: 16/280,983

(22) Filed: Feb. 20, 2019

(65) Prior Publication Data

US 2019/0182128 A1    Jun. 13, 2019

Related U.S. Application Data

(63) Continuation of application No. 15/485,948, filed on Apr. 12, 2017, now Pat. No. 10,257,033.

(51) Int. Cl.
*H04L 12/24* (2006.01)
*H04L 29/08* (2006.01)
(Continued)

(52) U.S. Cl.
CPC ...... *H04L 41/5054* (2013.01); *H04L 41/0806* (2013.01); *H04L 41/145* (2013.01); *H04L 41/5045* (2013.01); *H04L 41/5096* (2013.01)

(58) Field of Classification Search
USPC ............................... 709/220, 212, 213, 226
See application file for complete search history.

(56) References Cited

U.S. PATENT DOCUMENTS 3,629,512 A    12/1971    Yuan
4,769,811 A    9/1988    Eckberg, Jr. et al.
(Continued)

FOREIGN PATENT DOCUMENTS

CN    102073546 A    7/2013
EP    3160073    4/2017
(Continued)

OTHER PUBLICATIONS

"AWS Lambda Developer Guide," Amazon Web Services Inc., Hamtad, May 2017, 416 pages.
(Continued)

*Primary Examiner* — Jude Jean Gilles
(74) *Attorney, Agent, or Firm* — Polsinelli PC

(57) ABSTRACT

In one embodiment, a method implements virtualized network functions in a serverless computing system having networked hardware resources. An interface of the serverless computing system receives a specification for a network service including a virtualized network function (VNF) forwarding graph (FG). A mapper of the serverless computing system determines an implementation graph comprising edges and vertices based on the specification. A provisioner of the serverless computing system provisions a queue in the serverless computing system for each edge. The provisioner further provisions a function in the serverless computing system for each vertex, wherein, for at least one or more functions, each one of said at least one or more functions reads incoming messages from at least one queue. The serverless computing system processes data packets by the queues and functions in accordance with the VNF FG. The queues and functions processes data packets in accordance with the VNF FG.

20 Claims, 7 Drawing Sheets

(51) Int. Cl.
*H04L 29/06* (2006.01)
*G06Q 10/06* (2012.01)

(56) References Cited

U.S. PATENT DOCUMENTS

| | | |
|---|---|---|
| 5,408,231 A | 4/1995 | Bowdon |
| 5,491,690 A | 2/1996 | Alfonsi et al. |
| 5,557,609 A | 9/1996 | Shobatake et al. |
| 5,600,638 A | 2/1997 | Bertin et al. |
| 5,687,167 A | 11/1997 | Bertin et al. |
| 6,115,384 A | 9/2000 | Parzych |
| 6,167,438 A | 12/2000 | Yates et al. |
| 6,400,681 B1 | 6/2002 | Bertin et al. |
| 6,493,804 B1 | 12/2002 | Soltis et al. |
| 6,661,797 B1 | 12/2003 | Goel et al. |
| 6,687,229 B1 | 2/2004 | Kataria et al. |
| 6,799,270 B1 | 9/2004 | Bull et al. |
| 6,888,828 B1 | 5/2005 | Partanen et al. |
| 6,993,593 B2 | 1/2006 | Iwata |
| 7,027,408 B2 | 4/2006 | Nabkel et al. |
| 7,062,567 B2 | 6/2006 | Benitez et al. |
| 7,095,715 B2 | 8/2006 | Buckman et al. |
| 7,096,212 B2 | 8/2006 | Tribble et al. |
| 7,139,239 B2 | 11/2006 | Mcfarland et al. |
| 7,165,107 B2 | 1/2007 | Pouyoul et al. |
| 7,197,008 B1 | 3/2007 | Shabtay et al. |
| 7,197,660 B1 | 3/2007 | Liu et al. |
| 7,209,435 B1 | 4/2007 | Kuo et al. |
| 7,227,872 B1 | 6/2007 | Biswas et al. |
| 7,231,462 B2 | 6/2007 | Berthaud et al. |
| 7,333,990 B1 | 2/2008 | Thiagarajan et al. |
| 7,443,796 B1 | 10/2008 | Albert et al. |
| 7,458,084 B2 | 11/2008 | Zhang et al. |
| 7,472,411 B2 | 12/2008 | Wing et al. |
| 7,486,622 B2 | 2/2009 | Regan et al. |
| 7,536,396 B2 | 5/2009 | Johnson et al. |
| 7,552,201 B2 | 6/2009 | Areddu et al. |
| 7,558,261 B2 | 7/2009 | Arregoces et al. |
| 7,567,504 B2 | 7/2009 | Darling et al. |
| 7,571,470 B2 | 8/2009 | Arregoces et al. |
| 7,573,879 B2 | 8/2009 | Narad et al. |
| 7,610,375 B2 | 10/2009 | Portolani et al. |
| 7,643,468 B1 | 1/2010 | Arregoces et al. |
| 7,644,182 B2 | 1/2010 | Banerjee et al. |
| 7,647,422 B2 | 1/2010 | Singh et al. |
| 7,657,940 B2 | 2/2010 | Portolani et al. |
| 7,668,116 B2 | 2/2010 | Wijnands et al. |
| 7,684,321 B2 | 3/2010 | Muirhead et al. |
| 7,738,469 B1 | 6/2010 | Shekokar et al. |
| 7,751,409 B1 | 7/2010 | Carolan |
| 7,793,157 B2 | 9/2010 | Bailey et al. |
| 7,814,284 B1 | 10/2010 | Glass et al. |
| 7,831,693 B2 | 11/2010 | Lai |
| 7,860,095 B2 | 12/2010 | Forissier et al. |
| 7,860,100 B2 | 12/2010 | Khalid et al. |
| 7,882,247 B2 | 2/2011 | Sturniolo et al. |
| 7,895,425 B2 | 2/2011 | Khalid et al. |
| 7,899,012 B2 | 3/2011 | Ho et al. |
| 7,899,861 B2 | 3/2011 | Feblowitz et al. |
| 7,907,595 B2 | 3/2011 | Khanna et al. |
| 7,908,480 B2 | 3/2011 | Firestone et al. |
| 7,983,174 B1 | 7/2011 | Monaghan et al. |
| 7,990,847 B1 | 8/2011 | Leroy et al. |
| 8,000,329 B2 | 8/2011 | Fendick et al. |
| 8,018,938 B2 | 9/2011 | Fromm et al. |
| 8,094,575 B1 | 1/2012 | Vadlakonda et al. |
| 8,166,465 B2 | 4/2012 | Feblowitz et al. |
| 8,180,909 B2 | 5/2012 | Hartman et al. |
| 8,191,119 B2 | 5/2012 | Wing et al. |
| 8,195,774 B2 | 6/2012 | Lambeth et al. |
| 8,280,354 B2 | 10/2012 | Smith et al. |
| 8,281,302 B2 | 10/2012 | Durazzo et al. |
| 8,291,108 B2 | 10/2012 | Raja et al. |
| 8,305,900 B2 | 11/2012 | Bianconi |
| 8,311,045 B2 | 11/2012 | Quinn et al. |
| 8,316,457 B1 | 11/2012 | Paczkowski et al. |
| 8,355,332 B2 | 1/2013 | Beaudette et al. |
| 8,442,043 B2 | 5/2013 | Sharma et al. |
| 8,464,336 B2 | 6/2013 | Wei et al. |
| 8,479,298 B2 | 7/2013 | Keith et al. |
| 8,498,414 B2 | 7/2013 | Rossi |
| 8,520,672 B2 | 8/2013 | Guichard et al. |
| 8,601,152 B1 | 12/2013 | Chou |
| 8,612,612 B1 | 12/2013 | Dukes et al. |
| 8,627,328 B2 | 1/2014 | Mousseau et al. |
| 8,676,965 B2 | 3/2014 | Gueta |
| 8,676,980 B2 | 3/2014 | Kreeger et al. |
| 8,700,892 B2 | 4/2014 | Bollay et al. |
| 8,730,980 B2 | 5/2014 | Bagepalli et al. |
| 8,743,885 B2 | 6/2014 | Khan et al. |
| 8,751,420 B2 | 6/2014 | Hjelm et al. |
| 8,762,534 B1 | 6/2014 | Hong et al. |
| 8,762,707 B2 | 6/2014 | Killian et al. |
| 8,792,490 B2 | 7/2014 | Jabr et al. |
| 8,793,400 B2 | 7/2014 | Mcdysan et al. |
| 8,819,419 B2 | 8/2014 | Carlson et al. |
| 8,825,070 B2 | 9/2014 | Akhtar et al. |
| 8,830,834 B2 | 9/2014 | Sharma et al. |
| 8,904,037 B2 | 12/2014 | Haggar et al. |
| 8,949,847 B2 | 2/2015 | Kim et al. |
| 8,984,284 B2 | 3/2015 | Purdy, Sr. et al. |
| 9,001,827 B2 | 4/2015 | Appenzeller |
| 9,032,181 B2 | 5/2015 | Ahmad et al. |
| 9,071,533 B2 | 6/2015 | Hui et al. |
| 9,077,661 B2 | 7/2015 | Andreasen et al. |
| 9,088,584 B2 | 7/2015 | Feng et al. |
| 9,130,872 B2 | 9/2015 | Kumar et al. |
| 9,143,438 B2 | 9/2015 | Khan et al. |
| 9,160,797 B2 | 10/2015 | Mcdysan |
| 9,178,812 B2 | 11/2015 | Guichard et al. |
| 9,253,274 B2 | 2/2016 | Quinn et al. |
| 9,300,585 B2 | 3/2016 | Kumar et al. |
| 9,338,097 B2 | 5/2016 | Anand et al. |
| 9,344,337 B2 | 5/2016 | Kumar et al. |
| 9,374,297 B2 | 6/2016 | Bosch et al. |
| 9,379,931 B2 | 6/2016 | Bosch et al. |
| 9,385,950 B2 | 7/2016 | Quinn et al. |
| 9,398,486 B2 | 7/2016 | La Roche, Jr. et al. |
| 9,407,540 B2 | 8/2016 | Kumar et al. |
| 9,413,655 B2 | 8/2016 | Shatzkamer et al. |
| 9,436,443 B2 | 9/2016 | Chiosi et al. |
| 9,479,443 B2 | 10/2016 | Bosch et al. |
| 9,491,094 B2 | 11/2016 | Patwardhan et al. |
| 9,537,836 B2 | 1/2017 | Maller et al. |
| 9,558,029 B2 | 1/2017 | Behera et al. |
| 9,559,970 B2 | 1/2017 | Kumar et al. |
| 9,608,896 B2 | 3/2017 | Kumar et al. |
| 9,723,106 B2 | 8/2017 | Shen et al. |
| 9,794,379 B2 | 10/2017 | Kumar et al. |
| 10,019,244 B1 * | 7/2018 | Rocamora ........... G06F 9/45508 |
| 10,257,033 B2 * | 4/2019 | Shimamura ........ H04L 41/0806 |
| 10,361,985 B1 * | 7/2019 | Shveykin ............ H04L 67/2842 |
| 10,454,795 B1 * | 10/2019 | Jonsson ................ H04L 65/605 |
| 2001/0023442 A1 | 9/2001 | Masters |
| 2002/0131362 A1 | 9/2002 | Callon |
| 2002/0156893 A1 | 10/2002 | Pouyoul et al. |
| 2002/0167935 A1 | 11/2002 | Nabkel et al. |
| 2003/0023879 A1 | 1/2003 | Wray |
| 2003/0037070 A1 | 2/2003 | Marston |
| 2003/0088698 A1 | 5/2003 | Singh et al. |
| 2003/0110081 A1 | 6/2003 | Tosaki et al. |
| 2003/0120816 A1 | 6/2003 | Berthaud et al. |
| 2003/0226142 A1 | 12/2003 | Rand |
| 2004/0109412 A1 | 6/2004 | Hansson et al. |
| 2004/0148391 A1 | 7/2004 | Lake, Sr. et al. |
| 2004/0199812 A1 | 10/2004 | Earl |
| 2004/0213160 A1 | 10/2004 | Regan et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0058118 A1 | 3/2005 | Davis |
| 2005/0060572 A1 | 3/2005 | Kung |
| 2005/0086367 A1 | 4/2005 | Conta et al. |
| 2005/0120101 A1 | 6/2005 | Nocera |

(56) References Cited

U.S. PATENT DOCUMENTS

| | | |
|---|---|---|
| 2005/0152378 A1 | 7/2005 | Bango et al. |
| 2005/0157645 A1 | 7/2005 | Rabie et al. |
| 2005/0160180 A1 | 7/2005 | Rabje et al. |
| 2005/0204042 A1 | 9/2005 | Banerjee et al. |
| 2005/0210096 A1 | 9/2005 | Bishop et al. |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan et al. |
| 2006/0045024 A1 | 3/2006 | Previdi et al. |
| 2006/0074502 A1 | 4/2006 | Mcfarland |
| 2006/0092950 A1 | 5/2006 | Arregoces et al. |
| 2006/0095960 A1 | 5/2006 | Arregoces et al. |
| 2006/0112400 A1 | 5/2006 | Zhang et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |
| 2007/0061441 A1 | 3/2007 | Landis et al. |
| 2007/0067435 A1 | 3/2007 | Landis et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn et al. |
| 2008/0181118 A1 | 7/2008 | Sharma et al. |
| 2008/0183853 A1 | 7/2008 | Manion et al. |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0291910 A1 | 11/2008 | Tadimeti et al. |
| 2009/0003364 A1 | 1/2009 | Fendick et al. |
| 2009/0006152 A1 | 1/2009 | Timmerman et al. |
| 2009/0094684 A1 | 4/2009 | Chinnusamy et al. |
| 2009/0204612 A1 | 8/2009 | Keshavarz-nia et al. |
| 2009/0300207 A1 | 12/2009 | Giaretta et al. |
| 2009/0305699 A1 | 12/2009 | Deshpande et al. |
| 2009/0328054 A1 | 12/2009 | Paramasivam et al. |
| 2010/0063988 A1 | 3/2010 | Khalid |
| 2010/0080226 A1 | 4/2010 | Khalid |
| 2010/0191612 A1 | 7/2010 | Raleigh |
| 2011/0023090 A1 | 1/2011 | Asati et al. |
| 2011/0137991 A1 | 6/2011 | Russell |
| 2011/0142056 A1 | 6/2011 | Manoj |
| 2011/0222412 A1 | 9/2011 | Kompella |
| 2011/0255538 A1 | 10/2011 | Srinivasan et al. |
| 2012/0131662 A1 | 5/2012 | Kuik et al. |
| 2012/0147894 A1 | 6/2012 | Mulligan et al. |
| 2012/0324442 A1 | 12/2012 | Barde |
| 2013/0003735 A1 | 1/2013 | Chao et al. |
| 2013/0044636 A1 | 2/2013 | Koponen et al. |
| 2013/0121137 A1 | 5/2013 | Feng et al. |
| 2013/0124708 A1 | 5/2013 | Lee et al. |
| 2013/0163594 A1 | 6/2013 | Sharma et al. |
| 2013/0163606 A1 | 6/2013 | Bagepalli et al. |
| 2013/0272305 A1 | 10/2013 | Lefebvre et al. |
| 2013/0311675 A1 | 11/2013 | Kancherla |
| 2013/0329584 A1 | 12/2013 | Ghose et al. |
| 2014/0036730 A1 | 2/2014 | Nellikar et al. |
| 2014/0105062 A1 | 4/2014 | McDysan et al. |
| 2014/0201305 A1* | 7/2014 | Dalal .................. G06F 12/0815 709/212 |
| 2014/0254603 A1 | 9/2014 | Banavalikar et al. |
| 2014/0279863 A1 | 9/2014 | Krishnamurthy et al. |
| 2014/0280836 A1 | 9/2014 | Kumar et al. |
| 2014/0321459 A1 | 10/2014 | Kumar et al. |
| 2014/0334295 A1 | 11/2014 | Guichard et al. |
| 2014/0362682 A1 | 12/2014 | Guichard et al. |
| 2014/0369209 A1 | 12/2014 | Khurshid et al. |
| 2014/0376558 A1 | 12/2014 | Rao et al. |
| 2015/0012584 A1 | 1/2015 | Lo et al. |
| 2015/0012988 A1 | 1/2015 | Jeng et al. |
| 2015/0029871 A1 | 1/2015 | Frost et al. |
| 2015/0032871 A1 | 1/2015 | Allan et al. |
| 2015/0052516 A1 | 2/2015 | French et al. |
| 2015/0074276 A1 | 3/2015 | DeCusatis et al. |
| 2015/0082308 A1 | 3/2015 | Kiess et al. |
| 2015/0085870 A1 | 3/2015 | Narasimha et al. |
| 2015/0092564 A1 | 4/2015 | Aldrin |
| 2015/0103827 A1 | 4/2015 | Quinn et al. |
| 2015/0131484 A1 | 5/2015 | Aldrin |
| 2015/0195197 A1* | 7/2015 | Yong .................. H04L 45/306 370/392 |
| 2015/0222516 A1 | 8/2015 | Deval et al. |
| 2015/0222533 A1 | 8/2015 | Birrittella et al. |
| 2015/0319078 A1 | 11/2015 | Lee et al. |
| 2015/0326473 A1 | 11/2015 | Dunbar et al. |
| 2015/0365495 A1 | 12/2015 | Fan et al. |
| 2015/0381465 A1 | 12/2015 | Narayanan et al. |
| 2015/0381557 A1 | 12/2015 | Fan et al. |
| 2016/0028604 A1 | 1/2016 | Chakrabarti et al. |
| 2016/0028640 A1 | 1/2016 | Zhang et al. |
| 2016/0050132 A1 | 2/2016 | Zhang |
| 2016/0080263 A1 | 3/2016 | Park et al. |
| 2016/0099853 A1 | 4/2016 | Nedeltchev et al. |
| 2016/0112502 A1 | 4/2016 | Clarke et al. |
| 2016/0119253 A1 | 4/2016 | Kang et al. |
| 2016/0127139 A1 | 5/2016 | Tian et al. |
| 2016/0165014 A1 | 6/2016 | Nainar et al. |
| 2016/0173464 A1 | 6/2016 | Wang et al. |
| 2016/0179560 A1 | 6/2016 | Ganguli et al. |
| 2016/0182684 A1 | 6/2016 | Connor et al. |
| 2016/0205041 A1* | 7/2016 | Lee .................. H04L 47/828 709/226 |
| 2016/0212017 A1 | 7/2016 | Li et al. |
| 2016/0226742 A1 | 8/2016 | Apathotharanan et al. |
| 2016/0285720 A1 | 9/2016 | Mäenpää et al. |
| 2016/0328273 A1 | 11/2016 | Molka et al. |
| 2016/0352629 A1 | 12/2016 | Wang et al. |
| 2016/0380966 A1 | 12/2016 | Gunnalan et al. |
| 2017/0019303 A1 | 1/2017 | Swamy et al. |
| 2017/0031804 A1 | 2/2017 | Ciszewski et al. |
| 2017/0078175 A1 | 3/2017 | Xu et al. |
| 2017/0187609 A1 | 6/2017 | Lee et al. |
| 2017/0208000 A1 | 7/2017 | Bosch et al. |
| 2017/0214627 A1 | 7/2017 | Zhang et al. |
| 2017/0237656 A1 | 8/2017 | Gage et al. |
| 2017/0279712 A1 | 9/2017 | Nainar et al. |
| 2017/0310611 A1 | 10/2017 | Kumar et al. |
| 2018/0007205 A1 | 1/2018 | Klein et al. |
| 2018/0101403 A1 | 4/2018 | Baldini Soares et al. |
| 2018/0113791 A1* | 4/2018 | Fink .................. G06F 11/3664 |
| 2018/0150528 A1 | 5/2018 | Shah et al. |
| 2018/0181756 A1 | 6/2018 | Campagna et al. |
| 2018/0254998 A1* | 9/2018 | Cello .................. H04L 41/5009 |
| 2018/0300173 A1 | 10/2018 | Shimamura et al. |
| 2018/0302277 A1* | 10/2018 | Shimamura ......... H04L 41/5054 |

FOREIGN PATENT DOCUMENTS

| | | |
|---|---|---|
| WO | WO 2011/029321 | 3/2011 |
| WO | WO 2012/056404 | 5/2012 |
| WO | WO 2015/180559 | 12/2015 |
| WO | WO 2015/187337 | 12/2015 |
| WO | WO 2016/004556 | 1/2016 |
| WO | WO 2016/058245 | 4/2016 |

OTHER PUBLICATIONS

"AWS Serverless Multi-Tier Architectures," Amazon Web Services Inc., Nov. 2015, 20 pages.
"Cisco NSH Service Chaining Configuration Guide," Cisco Systems, Inc., Jul. 28, 2017, 11 pages.
"Cisco and Intel High-Performance VNFs on Cisco NFV Infrastructure," White Paper, © 2016 Cisco I Intel, Oct. 2016, 7 pages.
"Cloud Functions Overview," Cloud Functions Documentation, Mar. 21, 2017, 3 pages; https://cloud.google.com/functions/docs/concepts/overview.
"Cloud-Native VNF Modelling," Open Source Mano, © ETSI 2016, 18 pages.

(56) References Cited

OTHER PUBLICATIONS

"Network Functions Virtualisation (NFV); Use Cases," ETSI, GS NFV 001 v1.1.1, Architectural Framework, © European Telecommunications Standards Institute, Oct. 2013, 50 pages.
"Understanding Azure a Guide for Developers," Microsoft Corporation, Copyright © 2016 Microsoft Corporation, 29 pages.
Aldrin, S., et al. "Service Function Chaining Operation, Administration and Maintenance Framework," Internet Engineering Task Force, Oct. 26, 2014, 13 pages.
Author Unknown, "ANSI/SCTE 35 2007 Digital Program Insertion Cueing Message for Cable," Engineering Committee, Digital Video Subcommittee, American National Standard, Society of Cable Telecommunications Engineers, © Society of Cable Telecommunications Engineers, Inc. 2007 All Rights Reserved, 140 Philips Road, Exton, PA 19341; 42 pages.
Author Unknown, "CEA-708," from Wikipedia, the free encyclopedia, Nov. 15, 2012; 16 pages http://en.wikipedia.org/w/index.php?title=CEA-708&oldid=523143431.
Author Unknown, "Digital Program Insertion," from Wikipedia, the free encyclopedia, Jan. 2, 2012; 1 page http://en.wikipedia.org/w/index.php?title=Digital_Program_Insertion&oldid=469076482.
Author Unknown, "Dynamic Adaptive Streaming over HTTP," from Wikipedia, the free encyclopedia, Oct. 25, 2012; 3 pages, http://en.wikipedia.org/w/index.php?title=Dynannic_Adaptive_Streanning_over_HTTP&oldid=519749189.
Author Unknown, "GStreamer and in-band metadata," from RidgeRun Developer Connection, Jun. 19, 2012, 5 pages https://developersidgerun.conn/wiki/index.php/GStreanner_and_in-band_nnetadata.
Author Unknown, "ISO/IEC JTC 1/SC 29, Information Technology—Dynamic Adaptive Streaming over HTTP (DASH)—Part 1: Media Presentation Description and Segment Formats," International Standard © ISO/IEC 2012—All Rights Reserved; Jan. 5, 2012; 131 pages.
Author Unknown, "M-PEG 2 Transmission," © Dr. Gorry Fairhurst, 9 pages [Published on or about Jan. 12, 2012] http://www.erg.abdn.ac.uk/future-net/digital-video/mpeg2-trans.html.
Author Unknown, "MPEG Transport Stream," from Wikipedia, the free encyclopedia, Nov. 11, 2012; 7 pages, http://en.wikipedia.org/w/index.php?title=MPEG_transport_streann&oldid=522468296.
Author Unknown, "Xilinx Demonstrates Reconfigurable Acceleration for Cloud Scale Applications at SC16," PR Newswire, Nov. 7, 2016, 9 pages; http://news.sys-con.com/node/3948204.
Author Unknown, "3GPP TR 23.803 V7.0.0 (Sep. 2005) Technical Specification: Group Services and System Aspects; Evolution of Policy Control and Charging (Release 7)," 3rd Generation Partnership Project (3GPP), 650 Route des Lucioles—Sophia Antipolis Valbonne—France, Sep. 2005; 30 pages.
Author Unknown, "3GPP TS 23.203 V8.9.0 (Mar. 2010) Technical Specification: Group Services and System Aspects; Policy and Charging Control Architecture (Release 8)," 3rd Generation Partnership Project (3GPP), 650 Route des Lucioles—Sophia Antipolis Val bonne—France, Mar. 2010; 116 pages.
Author Unknown, "3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles—Sophia Antipolis Valbonne—France, Dec. 2015, 337 pages.
Author Unknown, "3GPP TS 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9)," 3rd Generation Partnership Project (3GPP), 650 Route des Lucioles—Sophia Antipolis Valbonne—France, Jun. 2010; 259 pages.
Author Unknown, "3GPP TS 29.212 V13.1.0 (Mar. 2015) Technical Specification: 3rd Generation Partnership Project; Technical Specification Group Core Network and Terminals; Policy and Charging Control (PCC); Reference points (Release 13)," 3rd Generation Partnership Project (3GPP), 650 Route des Lucioles—Sophia Antipolis Valbonne—France, Mar. 2015; 230 pages.
Boucadair, Mohamed, et al., "Differentiated Service Function Chaining Framework," Network Working Group Internet Draft draft-boucadair-network-function-chaining-03, Aug. 21, 2013, 21 pages.
Burt, Jeff, "Intel Begins Shipping Xeon Chips With FPGA Accelerators," eWeek, Apr. 13, 2016, 3 pages.
Capdevila Pujol, P., "Deployment of NFV and SFC scenarios," EETAC, Master Thesis, Advisor: David Rinc6n Rivera, Feb. 17, 2017, 115 pages; https://upcommons.upc.edu/bitstream/handle/2117/101879/memoria_v2.pdf.
Chen, Yu-Ting, et al., "When Apache Spark Meets FPGAs: A Case Study for Next-Generation DNA Sequencing Acceleration," The 8th USENIX Workshop on Hot Topics in Cloud Computing, Jun. 20, 2016, 7 pages.
Ersue, Mehmet, "ETSI NFV Management and Orchestration—An Overview," Presentation at the IETF# 88 Meeting, Nov. 3, 2013, 14 pages.
Fahmy Suhaib A., et al., "Virtualized FPGA Accelerators for Efficient Cloud Computing," The University of Warwick, Cloud Computing Technology and Science (CloudCom), IEEE 7th International Conference, Nov. 30, 2015, 7 pages.
Farrel, A., et al., "A Path Computation Element (PCE)—Based Architecture," RFC 4655, Network Working Group, Aug. 2006, 40 pages.
Fayaz, Seyed K., et al., "Efficient Network Reachability Analysis using a Succinct Control Plane Representation," 2016, ratul.org, pp. 1-16.
Halpern, Joel, et al., "Service Function Chaining (SFC) Architecture," Internet Engineering Task Force (IETF), Cisco, Oct. 2015, 32 pages.
Hejtmanek, Lukas, "Scalable and Distributed Data Storage," is.muni.cz, Jan. 2005, pp. 1-58.
Hendrickson, S., et al. "Serverless Computation with OpenLambda." Elastic 60, University of Wisconson, Madison, Jun. 20, 2016, 7 pages, https://www.usenix.org/system/files/conference/hotcloud16/hotcloud16_hendrickson.pdf/.
Jain, Abhishek Kumar, "Architecture Centric Coarse-Grained FPGA Overlays," Nanyang Technological University, Jan. 2017, 195 pages.
Jiang, Yuanlong, et al., "Fault Management in Service Function Chaining," Network Working Group, China Telecom, Oct. 16, 2015, 13 pages.
Kachris, Christoforos, et al., "A Survey on Reconfigurable Accelerators for Cloud Computing," Conference Paper, Aug. 2016, 11 pages.
Kidane Hiliwi Leake, et al., "NoC Based Virtualized FPGA as Cloud Services," 3rd International Conference on Embedded Systems in Telecommunications and Instrumentation (ICESTI'16), Oct. 24, 2016, 6 pages.
Kumar, Surendra, et al., "Service Function Path Optimization: draft-kumar-sfc-sfp-optimization-00.txt," Internet Engineering Task Force, IETF; Standard Working Draft, May 10, 2014, 14 pages.
Neshatpour, Katayoun, et al., "Energy-Efficient Acceleration of Big Data Analytics Applications Using FPGAs," IEEE International Conference, Oct. 29, 2015, 9 pages.
Orellana, Julio Proano, et al., "FPGA-Aware Scheduling Strategies at Hypervisor Level in Cloud Environments," Hindawi Publishing Corporation, Scientific Programming, vol. 2016, Article ID 4670271, May 22, 2016, 13 pages.
Penno, Reinaldo, et al. "Packet Generation in Service Function Chains," draft-penno-sfc-packet-03, Apr. 29, 2016, 25 pages.
Penno, Reinaldo, et al. "Services Function Chaining Traceroute," draft-penno-sfc-trace-03, Sep. 30, 2015, 9 pages.
Pierre-Louis, M., "OpenWhisk: A quick tech preview," DeveloperWorks Open, IBM, Feb. 22, 2016, 7 pages; https://developer.ibm.com/open/2016/02/22/openwhisk-a-quick-tech-preview/.
Putnam, Andrew, et al., "A Reconfigurable Fabric for Accelerating Large-Scale Datacenter Services," Computer Architecture (ISCA), 41st International Symposium, Jun. 2014, 12 pages.
Quinn, Paul, et al., "Network Service Header," Network Working Group, draft-quinn-sfc-nsh-02.txt, Feb. 14, 2014, 21 pages.
Quinn, Paul, et al., "Network Service Header," Network Working Group, draft-quinn-nsh-00.txt, Jun. 13, 2013, 20 pages.

(56) References Cited

OTHER PUBLICATIONS

Quinn, Paul, et al., "Network Service Header," Network Working Group Internet Draft draft-quinn-nsh-01, Jul. 12, 2013, 20 pages.
Quinn, Paul, et al., "Service Function Chaining (SFC) Architecture," Network Working Group Internet Draft draft-quinn-sfc-arch-05.txt, May 5, 2014, 31 pages.
Weissman, Jon B. et al., "Optimizing Remote File Access for Parallel and Distributed Network Applications," users@cs.umn.edu, Oct. 19, 2017, pp. 1-25.
Westerbeek, Michiel, "Serverless Server-side Rendering with Redux-Saga," medium.com, Dec. 10, 2016, pp. 1-6.
Wikipedia contributors, "Serverless Computing," Wikipedia, the Free Encyclopedia, Jun. 11, 2017, 4 pages.
Wong, Fei, et al., "SMPTE-TT Embedded in ID3 for HTTP Live Streaming, draft-smpte-id3-http-live-streaming-00," Informational Internet Draft, Jun. 2012, 7 pages http://tools.ietf.org/htnnl/draft-snnpte-id3-http-live-streaming-00.
Yadav, R., "What Real Cloud-Native Apps Will Look Like," Crunch Network, Aug. 3, 2016, 8 pages; https://techcrunch.com/2016/08/03/what-real-cloud-native-apps-will-look-like/.

\* cited by examiner

○ PHYSICAL NETWORK LOGICAL INTERFACE

— VNF FORWARDING GRAPH LINK

US 10,938,677 B2

VIRTUALIZED NETWORK FUNCTIONS AND SERVICE CHAINING IN SERVERLESS COMPUTING INFRASTRUCTURE

CROSS-REFERENCE TO RELATED APPLICATIONS

This application is a Continuation of U.S. application Ser. No. 15/485,948, filed on Apr. 12, 2017, the content of which is incorporated herein by reference in its entirety.

TECHNICAL FIELD

This disclosure relates in general to the field of computing and, more particularly, to virtualized network functions in serverless computing infrastructure.

BACKGROUND

Network functions virtualization (NFV) is enables network functions, e.g., routing, loadbalancing, firewalls, deep packet inspection, etc., to run on general-purpose hardware. In other words, network functions can be virtualized in the cloud having networked hardware resources (e.g., network, compute, and storage resources). Virtualization of network functions enables a network administrator to easily take network functions in and out of service, and even scale them up and down. Network functions can be created on demand, and orchestration engines are often available to manage the network functions. As a result, many enterprise networks have adopted NFV for implementing their networks to simply network operations and lower operational costs.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

One aspect of the disclosure relates to, among other things, a method for implementing virtualized network functions in a serverless computing system having networked hardware resources. An interface of the serverless computing system receives a specification for a network service including a virtualized network function (VNF) forwarding graph (FG). A mapper of the serverless computing system determines an implementation graph comprising edges and vertices based on the specification. A provisioner of the serverless computing system provisions a queue in the serverless computing system for each edge. The provisioner further provisions a function in the serverless computing system for each vertex, wherein, for at least one or more functions, each one of said at least one or more functions reads incoming messages from at least one queue. The serverless computing system processes data packets by the queues and functions in accordance with the VNF FG. The queues and functions processes data packets in accordance with the VNF FG.

In other aspects, apparatuses comprising means for carrying out one or more of the method steps are envisioned by the disclosure. As will be appreciated by one skilled in the art, aspects of the disclosure, in particular the functionality associated with modelling and deploying scalable micro services herein, may be embodied as a system, a method or a computer program product. Accordingly, aspects of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g., a microprocessor, of a computer. Furthermore, aspects of the disclosure may take the form of a computer program product embodied in one or more computer readable medium(s) having computer readable program code embodied, e.g., stored, thereon.

EXAMPLE EMBODIMENTS

Understanding Network Functions Virtualization

Figure 1:
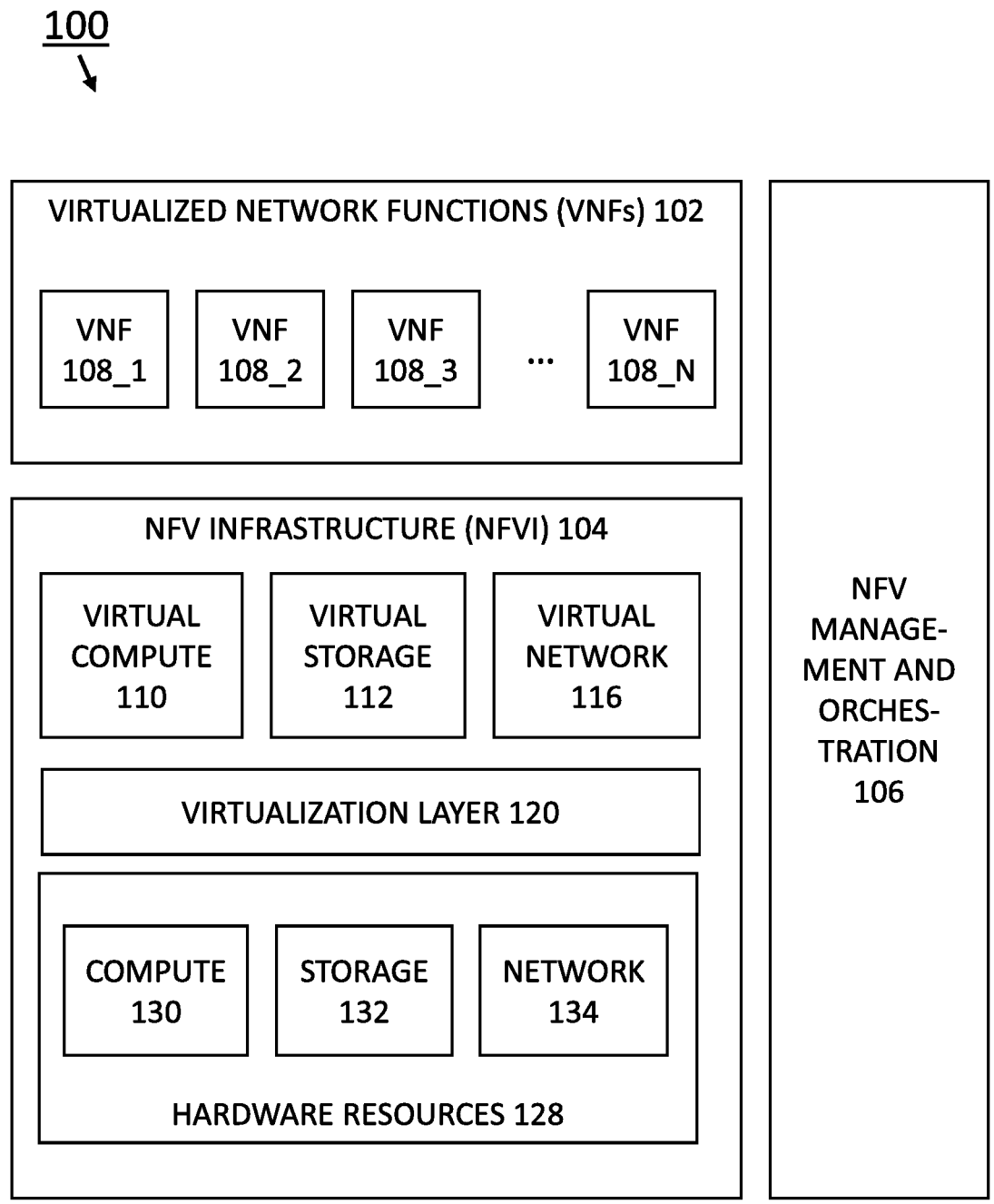
FIG. 1 shows an exemplary virtualization network functions forwarding graph, according to some embodiments of the disclosure.

Network Functions Virtualization (NFV) applies to data plane packet processing and control plane functions in mobile and fixed networks. FIG. 1 shows an exemplary network functions virtualization architecture 100, according to some embodiments of the disclosure. The architecture 100 includes virtualized network functions (VNFs) 102, NFV infrastructure (NFVI1) 104, and NFV management and orchestration (NFV_MANO) 106. Much like the infrastructure in a virtualized data center, the NFVI 104 is the collection of hardware and software implemented on the hardware for deployment of Virtual Network Functions (VNFs), such as VNF 108_1, 108_2, 108_3, . . . 108_N. Functions which can be virtualized can include e.g., routing, loadbalancing, firewalls, deep packet inspection, etc. The VNFs can include a software implemented on of any network function that is capable of running on the NFVI. The VNF corresponds to network nodes in traditional networks. Thus, VNFs provide existing networking functionality without any hardware dependency.

In some cases, the NFVI 104 is multi-tenant and leverages virtualization technology. NFVI 104 can include (off-theshelf) hardware resources 128 including hardware such as compute 130, storage 132, and network 134, and any accelerator components, if needed. The NFVI 104 can include a virtualization layer 120, which can abstract or virtualize the underlying hardware (hardware such as compute 130, storage 132, and network 134) from virtualized resources such as virtual compute 110, virtual storage 112, and virtual network 116. The VNFs 102 (e.g., VNF 108_1, 108_2, 108_3, ... 108_N) can be implemented on top of the NFVI 104. A VNF represents software implementation of any network function that is capable of running on the NFVI, and the VNF can correspond to network nodes in traditional physical networks. Thus, VNFs provide existing networking functionality without any hardware dependency. In addition to VNFs 102 on top of NFVI 104, the VNFs may be managed by NFV Management and Orchestration (MANO) 106. While NFV offers quite a lot of flexibility for network administrators to provision and configure their networks (e.g., scaling has been made easy through virtualization), but the provisioning and configuring of the VNFs still requires a bit of work and time.

Understanding VNFs and Service Chaining

Figure 2:
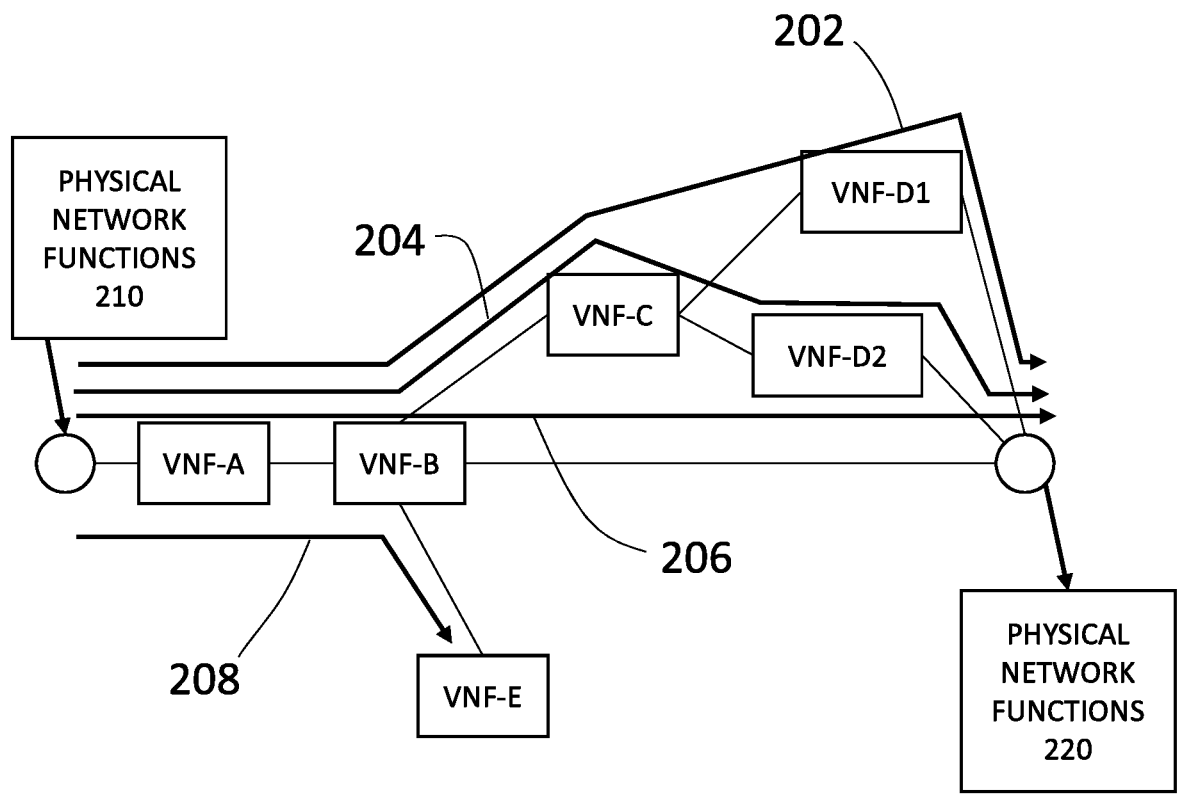
FIG. 2 shows an exemplary virtualized network function forwarding graph.

Networking services provided by NFV installations can be modeled as a Virtual Network Forwarding Graph (VNF FG), where nodes of the graph are VNFs and each edge is a logical connection between two VNFs. FIG. 2 shows an exemplary Virtual Network Forwarding Graph (VNF FG), according to some embodiments of the disclosure. Specifically, the exemplary VNF FG illustrates that a network service implemented with VNFs can include a collection of all possible network paths between the two groups of physical network function(s) ("PNFs"): PNFs 210 and PNFs 220. The boxes labeled PNFs 210 and PNFs 220 may each have one or more physical network functions or nodes therein. A physical network logical interface can provide an interface for network data to travel between PNFs 210 and the network formed by the VNFs, and another physical network logical interface can provide an interface for network data to travel between the network formed by the VNFs and PNFs 220. In this illustration, the VNFs include: VNF-A, VNF-B, VNF-C, VNF-D1, VNF-D1, and VNF-E. Between PNFs 210 and VNF-A is a physical network logical interface and VNF forwarding graph link (or "logical connection"). Between VNF-A and VNF-B is another VNF forwarding graph link. Between VNF-B and VNF-E is another VNF forwarding graph link. Between VNF-B and VNF-C is another VNF forwarding graph link. Between VNF-C and VNF-D1 is another VNF forwarding graph link. Between VNF-C and VNF-D2 is another VNF forwarding graph link. Between VNF-D1 and PNFs 220 is a VNF forwarding graph link and a physical network logical interface. Between VNF-D2 and PNFs 220 is a VNF forwarding graph link and a physical network logical interface. The possible network paths include path 202, path 204, path 206 and path 208. Path 202 traverses from PNFs 210, through VNF-A, VNF-B, VNF-C, and VNF-D1, to PNFs 220. Path 204 traverses from PNFs 210, through VNF-A, VNF-B, VNF-C, and VNF-D2, to PNFs 220. Path 206 traverses from PNFs 210, through VNF-A, and VNF-B, to PNFs 220. Path 208 traverses from PNFs 210, through VNF-A, VNF-B, and VNF-E.

The paths provide network paths for data or data flows to go through the VNF FG, such that the data or data flows can be processed by the network functions implemented in the VNFs. In some cases, the paths can be used as part of a service path for network service chaining, which may specify a specific service path for certain data or data flows to go through when the data or data flows enters the VNF FG, e.g., from PNFs 210 via a physical network logical interface. Network service chaining allows multiple service nodes to be included in a service path so that the packets that belong to a particular flow can travel through all the virtual service nodes in the service chain. Implementing network service chaining may involve encapsulating data packets of a data flow with a Network Service Header (NSH). Service chaining using NSH (referred herein as NSH Service Chaining), a service plane protocol, can create dynamic service chains NSH Service Chaining allows administrators to place and dynamically add services anywhere in the network, and gives flexibility in the network for service provisioning. In common deployment models, Service Functions (SFs) are inserted into the data-forwarding path of peers communicating with each other. However, with the introduction of service chaining functionality, SFs are not required to be located on the direct data path, rather the network traffic is routed through required SFs, wherever they are deployed. The SFs may be implemented as VNFs. NSH Service Chaining allows traffic flows to be classified so that only the desired flows are passed to the service. Moreover, classification enables network traffic to be dynamically moved to different service functions and service function paths without the need for major configuration changes or topology rewiring.

Typically, NSH is added to network traffic, in the packet header, to create a dedicated service plane that is independent of the underlying transport control protocol. In general, NSH includes path identification information, which is needed to realize a service path (e.g., including any one of the paths seen in FIG. 2). In addition, NSH adds the metadata information about the packet, service chain or both to an IP packet, depending on the header type configured.

Understanding Serverless Computing

Administrator having to provision the VNF FG or use VNFs to implement service chaining has to instantiate and configure each one of the VNFs and forwarding graph links to install the VNF FG. This is a time consuming task. It would be beneficial if instead of having to worry about the underlying physical infrastructure, the VNF FG implementation only have to specify information about the network functions. Serverless computing, as described herein, can advantageously allow the network functions implementation to focus purely on the constituent functions without having to worry about the underlying physical or even virtual infrastructure. Implementing a VNF FG and service chaining involving VNFs is made easy when the implementation can be done through a serverless computing API while the backend of the serverless system can take care of the rest. Effectively, the VNF FG specification and the implementation details are separated and abstracted away from the administrator.

Cloud computing aggregates physical and virtual compute, storage, and network resources in the "cloud" and offers users many ways to utilize the resources. One kind of product leveraging cloud computing is called Serverless Computing. Serverless computing offers a high level of compute abstraction, with a great deal of scalability. Developers no longer need to worry about the underlying physical or even virtual infrastructure in the cloud. Often, serverless computing frameworks are offered as a service, e.g., Amazon Web Services (AWS) Lambda (a compute service that runs code in response to events (making serverless computing an event-driven framework) and automatically manages the compute resources required by the code). Developers can pay for compute time consumed. Code can be uploaded to the serverless computing framework, and the serverless computing framework handles the rest (i.e., provisioning and configuring the VNFs).

Serverless computing works by having developers or users upload a piece of code to a serverless computing environment (or serverless computing platform or serverless environment), and the serverless computing environment runs the code without having to burden the developer or user with the setup of workers (i.e., networked hardware resources in the cloud, including compute, storage, and network resources) to execute the code. The serverless computing environment can be event driven, meaning that the code can execute or perform some kind of computations triggered by events. The triggering can be dictated by rules defined in the serverless computing environment. In some cases, the code is executed on demand, or according to a predetermined schedule. To use a serverless computing environment, a developer or user can upload a piece of code to be executed. The developer or user is abstracted from the setup and execution of the code in the networked hardware resources in the cloud.

There are many different flavors of serverless computing environments (in some cases, the serverless computing environments are virtualized computing environments having an application programming interface which abstracts the user from the implementation and configuration of a service or application in the cloud). Some serverless computing environments may have restrictions on the kind of code that it can run, i.e., some serverless computing environment can only execute code written in a number of supported programming languages. Some serverless computing environments may be more suited for a particular kind of process (e.g., database operations, machine learning, stream processing, etc.). Some serverless computing environments may differ in the operating systems on which the code is executed. Some serverless computing environments may differ in their support for dependencies management (libraries for executing code). If the serverless computing environments are part of a public cloud or is a service offered by a company, the serverless computing environments may have different associated costs. Some serverless computing environments may be part of a private cloud, where the networked hardware resources are on-premise and managed by the developer. Scalability, availability, and resource limits may differ from one serverless computing environment to another. Some serverless computing environments may have different limits on the maximum number of functions, concurrent executions, maximum execution duration length, etc. Some serverless computing environments may only support certain specific event subscribers or monitors platforms. Some serverless computing environments may only support certain kinds of notifications, logging, etc. Serverless computing environments can be different in many respects.

Serverless computing aims to provide a higher level of compute abstraction which allows developers and users to not have to worry about the underlying physical or even virtual infrastructure. A generalized serverless computing system can provide an immutable and flexible execution environment. Users can submit an execution task, e.g., a user defined function (UDF), which can include executable start-up scripts, files associated to the task, meta information of the task, etc. For instance, an execution task can include a set of binary codes and shell scripts, and so forth. The serverless computing system supports for both pull/push event handling. For instance, the serverless computing system can provide representational state transfer (REST) APIs to invoke the monitoring agents to keep track with external events, so that users are able to execute their submitted tasks either via calling REST API (pushing events) or monitoring status of external resources with some interval (pulling events) Immutability of the task execution can be achieved by building or provisioning, e.g., a new Linux container, a virtual machine, a physical machine with certain configuration, before invoking the execution and using it for the environment. Notification feature also can be a part of the serverless computing system. For instance, users can setup the notification rule according to the result of their tasks. Example of serverless computing services are AWS Lambda, Azure Cloud Functions, Google Cloud Functions, or Apache OpenWhisk.

Figure 3:
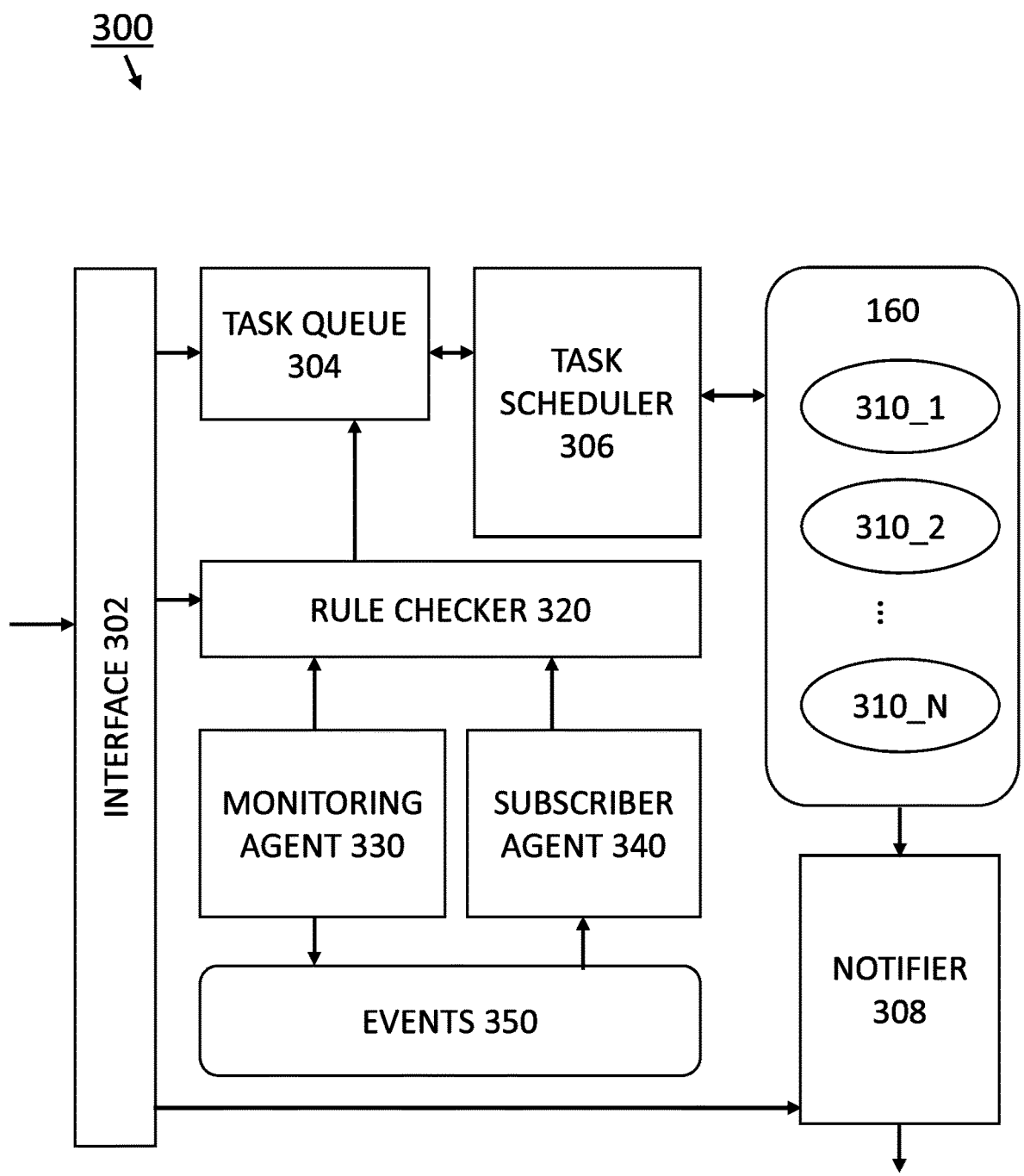
FIG. 3 shows an exemplary serverless computing system, according to some embodiments of the disclosure.

FIG. 3 illustrates an exemplary serverless computing system 300, according to some embodiments of the disclosure. The system 300 can include: an interface 302, task queue 304, task scheduler 306, and networked hardware resources 360 having workers 310_1, 310_2, . . . 310_N. The interface 302 allows a developer or user (machine) to interact with the serverless computing system 300 via a predefined application programming interface (API). Via the interface 302, a user can provide a task definition to create an action (associated with some piece of code) for the serverless computing system 300 to execute. The interface 302 can include a command line and/or a graphical user interface to facilitate the user interactions, such as inputting and specifying the task definition. The interface 302 is an abstraction layer which would allow a developer or user to use different serverless computing environments deployed in the public cloud(s) and/or private cloud(s).

Task queue 304 can include one or more data structure which stores tasks which are to be executed by the serverless computing system 300. The tasks which are stored in the task queue 304 can come from a plurality of sources, including from a developer/user via the interface 302. A task can be considered an execution unit or an action, which can include a set of binary codes and a shell script. Via interface 302, developers/users can push tasks to the task queue 304. Task scheduler 306 is configured schedule and decide how to execute the tasks in the task queue 304. The task scheduler 306 would be responsible for assigning tasks to any one of the workers 310_1, 310_2, . . . 310_N. In some embodiments, the task scheduler 306 can optimize the assignment of tasks from the task queue. In some embodiments, the task scheduler 306 may assign tasks from the task queue according to a suitable assignment scheme, e.g., an assignment scheme which assigns task to random workers, etc.

One unique aspect of the serverless computing system 300 is that networked hardware resources 360 having workers 310_1, 310_2, . . . 310_N can include different serverless computing environments and/or cloud computing environments with heterogeneous characteristics. For instance, networked hardware resources 360 having workers 310_1, 310_2, . . . 310_N can be implemented in different environments, including but not limited to, Apache Kafka (a scalable stream processing computing environment), AWS Lambda, IBM OpenWisk, Google Cloud Functions, Windows Azure Functions, OpenStack, local Docker environment (e.g., private cloud with support for implementing Containers), local environment (e.g., private cloud) with support for virtual machines, local environment (e.g., private cloud) with support for microservices, etc. The networked hardware resources 160 can include resources in one or more of the following: one or more public clouds, one or private clouds, and one or more hybrid clouds (having both public and private clouds).

The interface 302 abstracts the APIs from the different environments and enables the integration of different environments under a unified API. In some embodiments, the interface 302 also exposes the workers 310_1, 310_2, . . . 310_N in a way to enable developers/users to access the environments or define rules based on the environments. Task scheduler can select one of the available workers 310_1, 310_2, . . . 310_N from any suitable serverless computing environment (private cloud, public cloud, local Docker, etc.), since system 300 is implemented on top of many different serverless computing environments and/or cloud computing environments. This aspect provides a great deal of flexibility for the developer to execute tasks. A developer can even deploy functions in a public and private setting (executing tasks in a hybrid setting). Such aspect can potentially speed up the development of applications or new cloud native applications (in the fields such as internet of things, network function virtualization, etc.).

As an event-driven architecture, the serverless computing system 300 can further include rule checker 320, monitoring agent 330 and/or subscriber manager 340, and events 350. The system 300 can include more than one monitoring agent 330. The system 300 can include more than one subscriber agent 330. The system 300 can include more than one events (event sources) 350. The serverless computing system 300 can deal with both pull-type and push-type event driven workflows. Rule checker 320 can receive rules (e.g., rule definitions) from a developer/user, and/or have predefined rules. The rules can be of a form of event condition action (ECA), which can check one or more events against one or more conditions and performs one or more actions based on the outcome of the check. In some embodiments, a monitoring agent 330 (e.g., Kafka monitoring agent, Rabbit monitoring agent, etc.) can poll an external event source, i.e., events 350. The events monitored by the monitoring agent 330 can be checked by rule checker 320 based on the rules therein. If an action is to be performed based on one or more rules rule, the one or more actions are to be added to the task queue as one or more tasks. In some embodiments, a subscriber agent 340 can subscribe to an external event source, i.e., events 350. The events subscribed by the subscriber agent 340 can be checked by rule checker 320 based on the rules therein. If one or more actions are be performed based on one or more rules, the one or more actions can be added to the task queue as one or more tasks. In some embodiments, any one or more of the workers 310_1, 310_2, . . . 310_N may generate output which can be fed to events 350, which could in turn trigger tasks to be added to the task queue by the rule checker 320 and either the monitoring agent 330 and/or the subscriber agent 340. In some embodiments, any one or more of the workers 310_1, 310_2, . . . 310_N may generate output which can be fed to rule checker 320, which could in turn trigger tasks to be added to the task queue.

In some embodiments, the serverless computing system 300 can include a notification system. The interface 302 can accept notification definitions which requests notifier 308 to output one or more notifications based on output(s) from any one or more of the workers 310_1, 310_2, . . . 310_N. For instance, the success/failure/status from an execution of a task can be output to a developer/user by notifier 308. In another instance, the output data or a derivation of the output data from executing of a task by any one or more of the workers 110_1, 110_2, . . . 110_N can be output to a developer/user by notifier 108. Exemplary notifier 108 includes Hypertext Transfer Protocol (HTTP) notifier, Kafka notifier, etc.

In some embodiments, any one of the workers 310_1, 310_2, . . . 310_N can also push/add task(s) to the task queue 304.

Implementing a VNF FG with Serverless Computing

A serverless computing system can be implemented in different ways, but in general, a serverless computing system provides an API which abstracts away the provisioning of physical and virtual resources from the developer/user, so that it becomes very simple for a developer/user to run code in the cloud. Rather than running code (or applications in a traditional sense), a serverless computing system can be augmented or implemented in a way to allow an administrator to upload a VNF FG specification and let the serverless computing system implement the VNF FG onto physical and/or virtual resources in the cloud. As seen in FIG. 2, a VNF FG is a composition of multiple network functions (represented by VNF-A, VNF-B, VNF-C, VNF-D1, VNF-D1, and VNF-E in the example seen in FIG. 2). Respective network functions can be implemented by a serverless computing system, and an administrator can provision and configure a VNF FG via the serverless API (e.g., interface 302 of FIG. 3).

In some embodiments, an administrator can provide to the API a combination of calls which forms the VNF FG. In some embodiments, the administrator can provide a VNF FG specification according to a format specified by the serverless API. The administrator can additionally provide and specify one or more constraints on how to implement the VNF FG on physical and/or virtual resources. The constraints can specify which computing environment or serverless computing environment (e.g., what kind of worker or where the worker should be located) to use to implement the VNF FG, and so forth. The constraints can also include specifying one or more other aspects of the VNF FG (or the network service in general): quality of service, service level objectives, or service level agreements.

Figure 4:
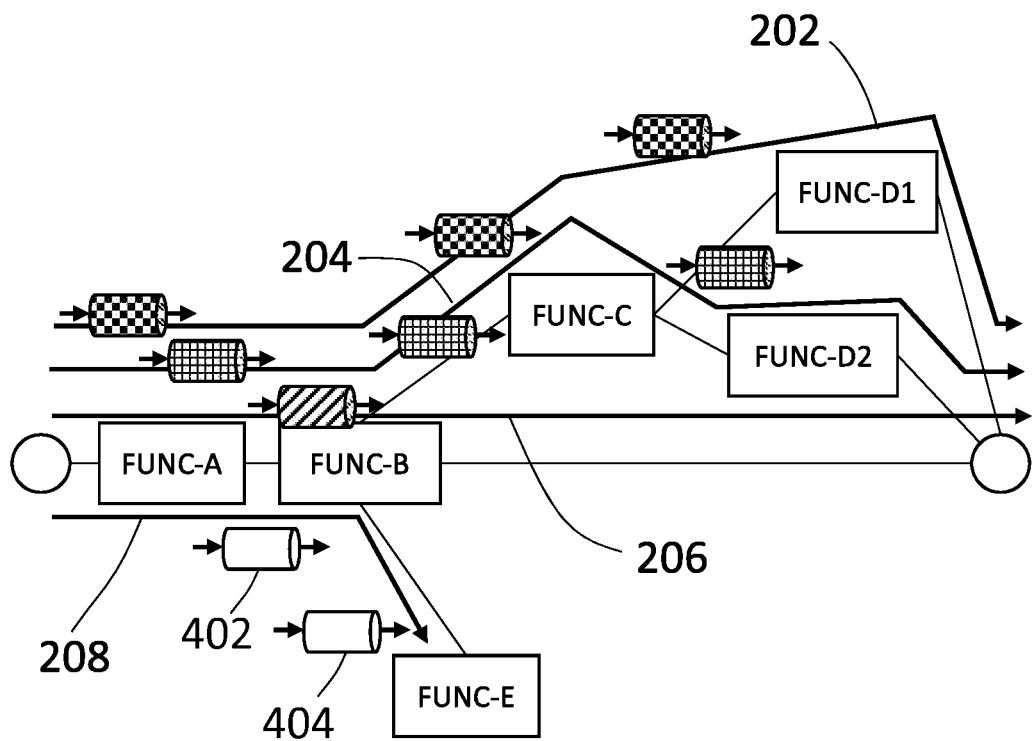
FIG. 4 illustrates mapping the exemplary virtualized network function forwarding graph of FIG. 2 into queues and functions, according to some embodiments of the disclosure.

Mapping the received specification via the API into a serverless computing environment is not trivial. FIG. 4 illustrates mapping the exemplary virtualized network function forwarding graph of FIG. 2 into queues and functions, according to some embodiments of the disclosure. As discussed previously with FIG. 2, VNF forwarding graph links connects two VNFs, and the VNF FG has a plurality of possible network paths through one or more of the VNFs (e.g., paths 202, 204, 206, and 208). To implement VNFs, functions such as lambda functions can be instantiated and provisioned on physical and/or virtual resources (e.g., as one or more workers in a serverless computing system). The functions can include logic which corresponds to the network function of the VNF. As seen in the example, VNF-A, VNF-B, VNF-C, VNF-D1, VNF-D1, and VNF-E of FIG. 2 can be implemented in the serverless computing system as corresponding functions: FUNC-A, FUNC-B, FUNC-C, FUNC-D1, FUNC-D1, and FUNC-E of FIG. 4. To chain VNFs to implement a network path or service path, a message bus or streaming queue/topic can be instantiated. One example of such message bus or streaming queue/topic is an Apache Kafka queue. For instance, path 208 seen in FIG. 4 chaining VNFs, VNF-A, VNF-B, VNF-E can be implemented as (lambda) functions, FUNC-A, FUNC-B, and FUNC-E, can be implemented using a first queue 402 (e.g., topic) for the edge connecting FUNC-A to FUNC-B, and a second queue 404 (e.g., topic) for the edge connecting FUNC-B and FUNC-E. FUNC-B can subscribe to the first queue 402, and FUNC-E can subscribe to the second queue 404.

Using this scheme, it is possible to provision queues and functions to implement paths in simple to complex VNF FGs. Based on a VNF FG, an implementation graph can be determined which comprises possible paths of the VNF FG, and queues and functions can be provisioned based on the implementation graph to implement the VNF FG. In general, for an implementation graph G(V,E), V as the set of vertices, and E as the set of edges, for every edge e(i,j), a queue or topic named ij is provisioned, and vertex v(j) subscribes to queue/topic ij for all i. Then, triggers and actions can be provisioned for each vertex. Once the processing is done by a vertex (i.e., a VNF), a new message is created for the queue/topic corresponding to the edge leading from the current vertex to the next vertex. FIG. 4 illustrates how other paths can be implemented using queues and functions. Besides implementing network paths, network service chaining can, advantageously, be implemented in a serverless computing system.

Figure 5:
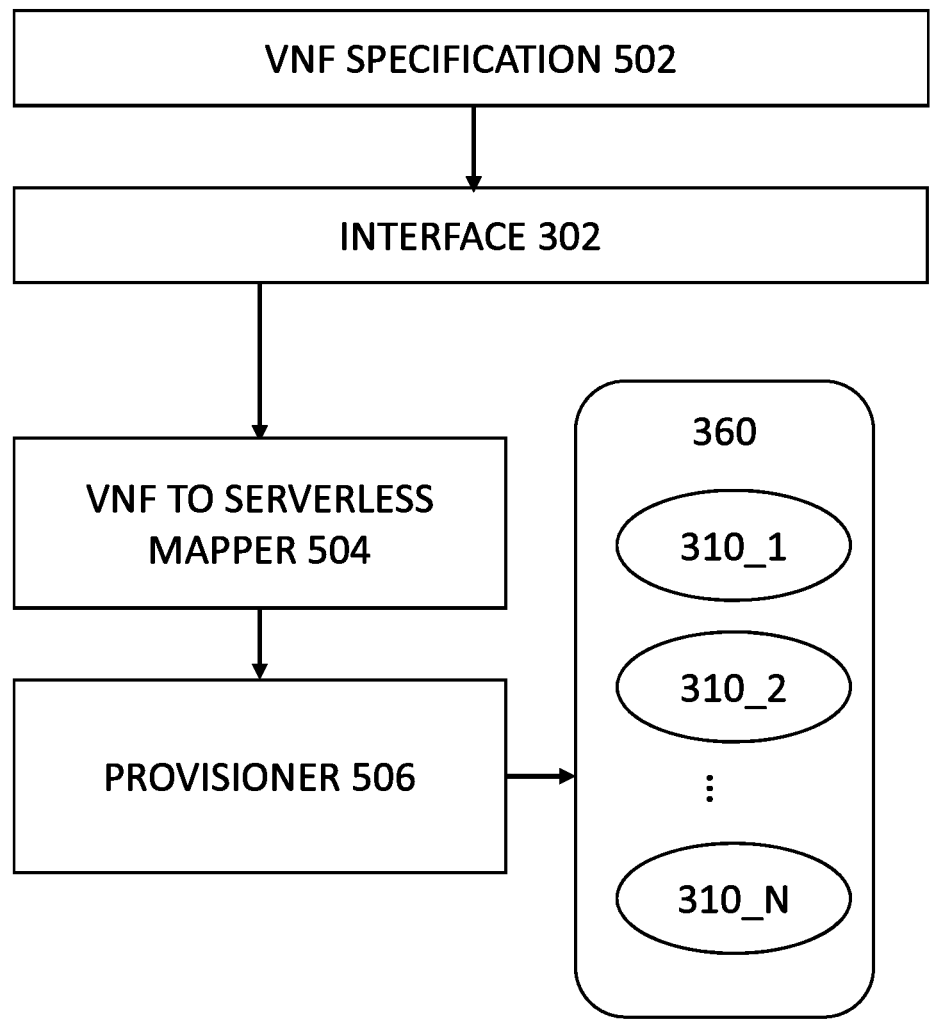
FIG. 5 shows another exemplary serverless computing system extended to map virtualized network functions to a serverless computing environment, according to some embodiments of the disclosure.

FIG. 5 shows another exemplary serverless computing system configured or extended to map virtualized network functions to a serverless computing environment, according to some embodiments of the disclosure. In addition to the interface (API) 302 and networked hardware resources 360 having workers 310_1, 310_2, . . . 310_N as previously described in relation to FIG. 3, the serverless computing system 500 of FIG. 5 includes a mapper, shown as VNF to serverless mapper 504, and provisioner 506. The mapper can provide a function of translating the received VNF specification 502 to an implementation graph, which in turn can be used by provisioner 506 to provision queues and functions using the networked hardware resources 360. The resulting system 500 implements VNF FG in a serverless computing environment by mapping a VNF FG into a chain of (lambda) functions or serverless compute functions and linking the functions using queues/topics. The networked hardware resources 360 can include a variety of serverless computing environments, such as lambda services from Amazon Web Services, Windows Azure, Google, and other public/private/hybrid cloud serverless computing systems, open source implementations like OpenWhisk, Apache Kafka, and other suitable streaming data processing system. System 500 can simplify implementation of VNF FG though abstraction. Using a serverless computing system, lifecycle management is made easier for the administrators, and implementation can be less burdensome for administrators. The speed at which a VNF FG can be deployed can be increased.

If desired, the system 500 can include a scheduler which can optimize which worker may be most suited to implement the queues and functions for the VNF FG. The scheduler can be implemented in provisioner 506, or at the output of the provisioner 506 as a separate component of system 500. The VNF specification 502 (e.g., VNF descriptors) or information from an orchestration/management entity may prescribe certain specifications and/or (performance and/or organizational) requirements for the VNFs and/or the forwarding graph links. A scheduler can perform an optimization algorithm which can determine assignments of queues and functions to different workers of networked hardware resources 360 while taking the requirements and capabilities of the different workers in networked hardware resources 360 (and possibly the costs of using the different workers in various serverless computing environments) into account. Furthermore, the scheduler may determine the number of instances which can ensure that the implementation of the VNF FG meets certain performance requirements (e.g., requirements as part of a service level objective or service level agreement). Suppose a forwarding graph link has a throughput requirement. A scheduler may determine that multiple queues are needed to implement an edge corresponding to the forwarding graph link to meet the throughput requirement.

Method for Implementing VNFs in a Serverless Computing Environment

Figure 6:
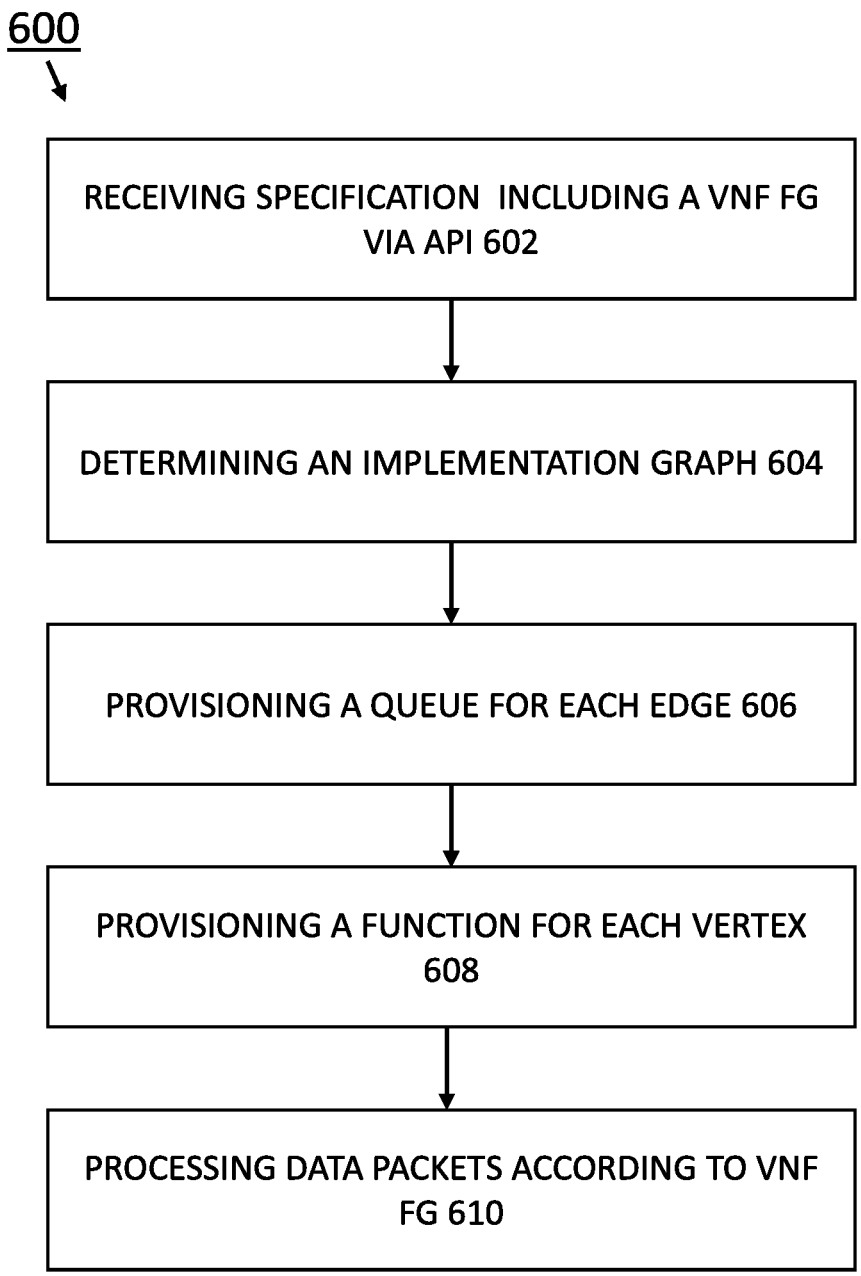
FIG. 6 depicts a flow diagram illustrating a method for implementing virtualized network functions in a serverless computing environment, according to some embodiments of the disclosure.

FIG. 6 depicts a flow diagram illustrating a method for implementing virtualized network functions in a serverless computing environment having networked hardware resources, according to some embodiments of the disclosure. The method can be implemented using mapper 504 and provisioner 506 of FIG. 5.

In 602, an interface for a serverless computing system can receive a specification for a network service including a virtualized network function (VNF) forwarding graph (FG) (via an application programming interface of a serverless computing system). The specification can be in various suitable formats, so long as the specification provides information which specifies the functions of respective VNFs and forwarding graph links between different VNFs. In 604, a mapper of the serverless computing system can determine an implementation graph comprising edges and vertices based on the specification. For instance, the mapper can transform the VNF FG into G(V,E).

The specification can specify one or more network paths (such as the ones seen in FIG. 4), and the edges and vertices of the implementation graph represent the one or more network paths through one or more VNFs specified in the specification. In some embodiments, a VNF specification includes a VNF forwarding graph descriptor and VNF descriptor. A VNF forwarding graph descriptor can include the topology of the interconnected VNFs, such as information regarding the forwarding graph links, and any physical/logical interfaces. VNF descriptor can include code or scripts which correspond to the functions being performed by the VNFs. In some cases, the VNF descriptor can include required storage and computation resources and other specifications/requirements of the VNFs.

In 606, a provisioner of the serverless computing system can provision a queue in serverless computing system for each edge. Examples of queues being provisioned for an edge is illustrated by FIG. 4. For each edge e(i,j), a queue can be provisioned named e_i_j. In a realistic VNF representation (and as shown in FIGS. 2 and 4), there might be multiple edges between two vertices corresponding to different network paths. This means that a VNF (i.e., a vertex in the graph) can be processing different kinds of data packets traversing over different network paths, and the VNF may need to perform a different action based on the kind of data packet. In an equivalent implementation, a single queue is used for multiple edges between two vertices, and the VNF function (i.e., the logic for implementing the VNF function) is configured to differentiate between the different packet types. Whether to implement using a single queue or multiple queues can depend on the implementation. In 608, the provisioner provisions a function in the serverless computing system for each vertex, wherein, for at least one or more functions, each one of said at least one or more functions reads incoming messages from at least one queue. Furthermore, for at least one or more functions, each one of said at least one or more functions can write outgoing messages to at least one queue. In other words, for each vertex v_j, the provisioner can provision or instantiate a (lambda) function instance on networked hardware resources of the serverless computing environment. A vertex, i.e., a VNF implemented as a function in the serverless computing system, can write data packets to an outgoing queue, and also subscribe to data packets from an incoming queue. Each queue can store a stream of messages, i.e., network data such as data packets, etc., to which at least one or more functions subscribe. In 610, the serverless computing environment (having networked hardware resources) can process data packets using the queues and functions in accordance with the VNF FG.

Example of a Lambda Function for Implementing Logic of a VNF

In some cases, provisioning the function for a given vertex includes provisioning a preamble, logic, and a postamble, which implement chaining of the VNFs using queues. The preamble specifies that the function reads incoming messages from one or more queues associated with one or more incoming edges to the given vertex. The logic corresponds to a virtualized network function for the given vertex. The logic can include code or scripts for implementing the network function. The virtualized network function can differ the virtualized network function differs between incoming messages originating from different queues. In other words, the logic may be conditioned on a specific queue from which a particular incoming message originated. This can be particularly useful if different queues are part of different network paths through the VNFs, and network data of the different network paths are to be processed differently. The postamble specifies that the function writes outgoing messages to one or more queues associated with one or more outgoing edges from the given vertex. The following is an exemplary format for defining a function for a given VNF:

memory 708 and one or more bulk storage devices 710. The local memory may refer to random access memory or other non-persistent memory device(s) generally used during actual execution of the program code. A bulk storage device may be implemented as a hard drive or other persistent data storage device. The processing system 700 may also include one or more cache memories (not shown) that provide temporary storage of at least some program code in order to reduce the number of times program code must be retrieved from the bulk storage device 710 during execution.

Input/output (I/O) devices depicted as an input device 712 and an output device 714 optionally can be coupled to the data processing system. User (machines) accessing the interface 102 would typically have such 110 devices. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening 110 controllers. In an embodiment, the input and the output devices may be implemented as a combined input/output device (illustrated in FIG. 7 with a dashed line surrounding the input device 712 and the output device 714). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

```
{
  preamble # read from (kafka) queues of the form e_*_j (i.e., all incoming edges/topics)
  VNF logic # logic for VNF might be different based on which incoming topic the message is from
  postamble # write to (kafka) queues of the form e_j_* (i.e., all outgoing edges/topics). Outgoing topic depends
on incoming topic and a single message can emit into multiple outgoing topics (if the VNF logic so chooses)
}
```

Data Processing System

Figure 7:
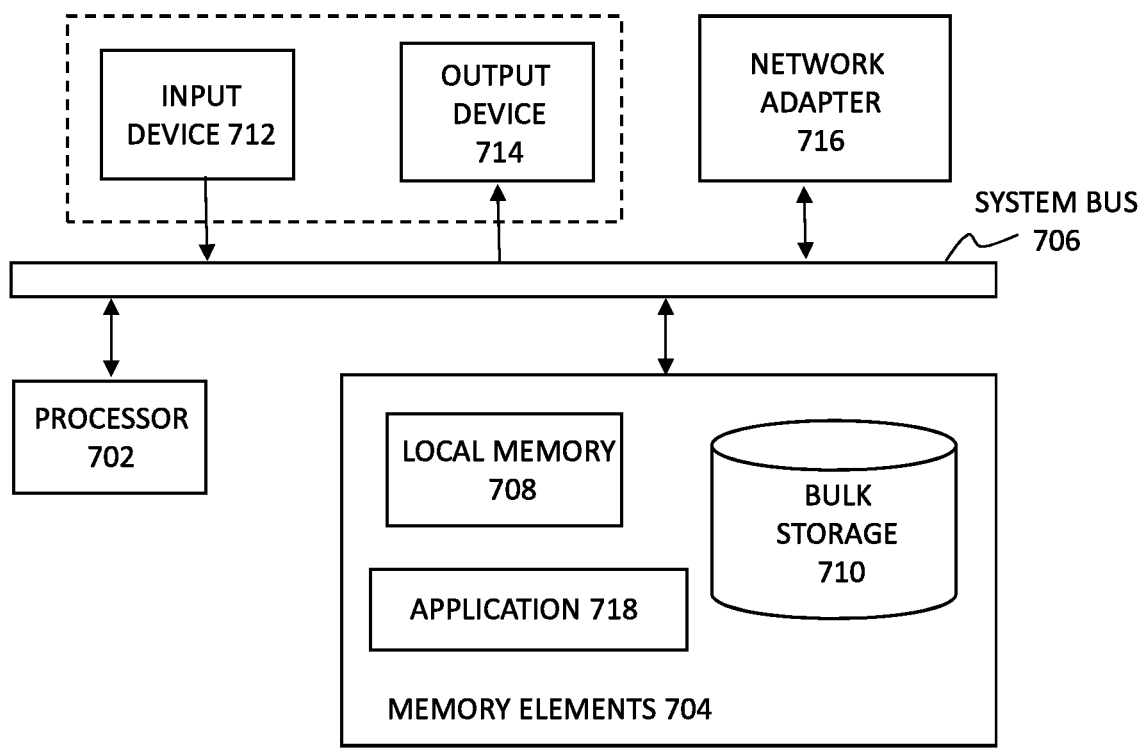
FIG. 7 illustrates an exemplary data processing system, according to some embodiments of the disclosure.

FIG. 7 depicts a block diagram illustrating an exemplary data processing system 700 (sometimes referred herein as a "node") that may be used to implement the functionality associated with any part of the serverless computing system (queues and functions seen in FIG. 4, any part of 100 of FIG. 1, any part of 300 of FIG. 3, and any part of 500 of FIG. 5) or user (machines) accessing any one part of the serverless computing system (e.g., via interface 102), according to some embodiments of the disclosure. For instance, networked hardware resources having the functionalities implemented thereon, may have one or more of the components of the system 700.

As shown in FIG. 7, the data processing system 700 may include at least one processor 702 coupled to memory elements 704 through a system bus 706. As such, the data processing system may store program code within memory elements 704. Further, the processor 702 may execute the program code accessed from the memory elements 704 via a system bus 706. In one aspect, the data processing system may be implemented as a computer that is suitable for storing and/or executing program code. It should be appreciated, however, that the data processing system 700 may be implemented in the form of any system including a processor and a memory that is capable of performing the functions described within this specification.

The memory elements 704 may include one or more physical memory devices such as, for example, local A network adapter 716 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 700, and a data transmitter for transmitting data from the data processing system 700 to said systems, devices and/or networks. Modems, cable modems, and Ethernet cards are examples of different types of network adapter that may be used with the data processing system 700.

As pictured in FIG. 7, the memory elements 704 may store an application 718. In various embodiments, the application 718 may be stored in the local memory 708, the one or more bulk storage devices 710, or apart from the local memory and the bulk storage devices. It should be appreciated that the data processing system 700 may further execute an operating system (not shown in FIG. 7) that can facilitate execution of the application 718. The application 718, being implemented in the form of executable program code, can be executed by the data processing system 700, e.g., by the processor 702. Responsive to executing the application, the data processing system 700 may be configured to perform one or more operations or method steps described herein.

Persons skilled in the art will recognize that while the elements 702-718 are shown in FIG. 7 as separate elements, in other embodiments their functionality could be implemented in lesser number of individual elements or distributed over a larger number of components.

EXAMPLES

Example 1 is a method for implementing virtualized network functions in a serverless computing system having networked hardware resources, comprising: receiving, by an interface of the serverless computing system, a specification for a network service including a virtualized network function (VNF) forwarding graph (FG), determining, by a mapper of the serverless computing system, an implementation graph comprising edges and vertices based on the specification, provisioning, by a provisioner of the serverless computing system, a queue in the serverless computing system for each edge, provisioning, by the provisioner, a function in the serverless computing system for each vertex, wherein, for at least one or more functions, each one of said at least one or more functions reads incoming messages from at least one queue; and processing data packets by the queues and functions in accordance with the VNF FG.

In Example 2, the method of Example 1 can further include for at least one or more functions, each one of said at least one or more functions writing outgoing messages to at least one queue.

In Example 3, the method of Example 1 or 2 can further include each queue storing a stream of messages to which at least one or more functions subscribe.

In Example 4, the method of any one of Examples 1-3 can further include: the specification specifying one or more network paths, and the edges and vertices of the implementation graph representing the one or more network paths through one or more VNFs specified in the specification.

In Example 5, the method of any one of Examples 1-4 can further include the specification further comprising one or more VNF descriptors, and the one or more VNF descriptors specifying scripts to be executed by the provisioned functions.

In Example 6, the method of any one of Examples 1-5 can further include provisioning the function for a given vertex comprising: provisioning a preamble for reading incoming messages from one or more queues associated with one or more incoming edges to the given vertex; provisioning logic corresponding to a virtualized network function for the given vertex; and provisioning a postamble for writing outgoing messages to one or more queues associated with one or more outgoing edges from the given vertex.

In Example 7, the method of Example 6 can further include the virtualized network function differing between incoming messages originating from different queues.

Example 8 is a serverless computing system comprising: at least one memory element; at least one processor coupled to the at least one memory element; an interface that when executed by the at least one processor is configured to receive, by an interface of the serverless computing system, a specification for a network service including a virtualized network function (VNF) forwarding graph (FG); a mapper that when executed by the at least one processor is configured to determine an implementation graph comprising edges and vertices based on the specification; a provisioner that when executed by the at least one processor is configured to: provision a queue for each edge, and provision a function for each vertex, wherein, for at least one or more functions, each one of said at least one or more functions reads incoming messages from at least one queue; and the queues and the functions that when executed by the at least one processor is configured to process data packets in accordance with the VNF FG.

In Example 9, the system of Example 8 can further include: for at least one or more functions, each one of said at least one or more functions writing outgoing messages to at least one queue.

In Example 10, the system of Example 8 or 9 can further include each queue storing a stream of messages to which at least one or more functions subscribe.

In Example 11, the system of any one of Examples 8-10 can further include: the specification specifying one or more network paths; and the edges and vertices of the implementation graph representing the one or more network paths through one or more VNFs specified in the specification.

In Example 12, the system of any one of Examples 8-10 can further include the specification further comprising one or more VNF descriptors, and the one or more VNF descriptors specify scripts to be executed by the provisioned functions.

In Example 13, the system of any one of Examples 8-11 can further include provisioning the function for a given vertex comprising: provisioning a preamble for reading incoming messages from one or more queues associated with one or more incoming edges to the given vertex; provisioning logic corresponding to a virtualized network function for the given vertex; and provisioning a postamble for writing outgoing messages to one or more queues associated with one or more outgoing edges from the given vertex.

In Example 14, the system of Example 13 can further include the virtualized network function differing between incoming messages originating from different queues.

Example 15 includes one or more computer-readable non-transitory media comprising one or more instructions, for implementing virtualized network functions in a serverless computing system having networked hardware resources, that when executed on a processor configure the processor to perform one or more operations comprising: receiving, by an interface of the serverless computing system, a specification for a network service including a virtualized network function (VNF) forwarding graph (FG); determining, by a mapper of the serverless computing system, an implementation graph comprising edges and vertices based on the specification; provisioning, by a provisioner of the serverless computing system, a queue in the serverless computing system for each edge; provisioning, by the provisioner, a function in the serverless computing system for each vertex, wherein, for at least one or more functions, each one of said at least one or more functions reads incoming messages from at least one queue; and processing data packets by the queues and functions in accordance with the VNF FG.

In Example 16, the media of Example 15 can further include for at least one or more functions, each one of said at least one or more functions writing outgoing messages to at least one queue.

In Example 17, the media of Example 15 or 16 can further include each queue storing a stream of messages to which at least one or more functions subscribe.

In Example 18, the media of any one of Example 15-17 can further include the specification specifying one or more network paths; and the edges and vertices of the implementation graph representing the one or more network paths through one or more VNFs specified in the specification.

In Example 19, the media of any one of Examples 15-18 can further include the specification further comprising one or more VNF descriptors, and the one or more VNF descriptors specify scripts to be executed by the provisioned functions.

In Example 20, the media of any one of Examples 15-19 can further include provisioning the function for a given vertex comprising: provisioning a preamble for reading incoming messages from one or more queues associated with one or more incoming edges to the given vertex; provisioning logic corresponding to a virtualized network function for the given vertex; and provisioning a postamble for writing outgoing messages to one or more queues associated with one or more outgoing edges from the given vertex; wherein the virtualized network function differs between incoming messages originating from different queues.

Example 21 is an apparatus comprising means for carrying out or implementing any one of the methods in Examples 1-7.

Variations and Implementations

Within the context of the disclosure, the cloud includes a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

As used herein in this Specification, the term 'network element' or 'node' in the cloud is meant to encompass any of the aforementioned elements, as well as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the disclosed operations. This may be inclusive of appropriate algorithms and communication protocols that allow for the effective exchange of data or information.

In one implementation, components seen in the FIGURES and other components described herein may include software to achieve (or to foster) the functions discussed herein for implementing VNFs in a serverless computing environment where the software is executed on one or more processors to carry out the functions. This could include the implementation of instances of an optimizer, provisioner, and/or any other suitable element that would foster the activities discussed herein. Additionally, each of these elements can have an internal structure (e.g., a processor, a memory element, etc.) to facilitate some of the operations described herein. Exemplary internal structure includes elements shown in data processing system in FIG. 7. In other embodiments, these functions for implementing VNFs in a serverless computing environment may be executed externally to these elements, or included in some other network element to achieve the intended functionality. Alternatively, the components seen in the FIGURES and other components described herein may include software (or reciprocating software) that can coordinate with other network elements in order to achieve the functions for implementing VNFs in a serverless computing environment described herein. In still other embodiments, one or several devices may include any suitable algorithms, hardware, software, components, modules, interfaces, or objects that facilitate the operations thereof.

In certain example implementations, the functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store information such as task definitions, task queues, rules, dependencies, costs, and capabilities described herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving the optimization functions, as outlined herein. Additionally, each of these devices may include a processor that can execute software or an algorithm to perform the optimization activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of implementing VNFs in a serverless computing environment, as potentially applied to a myriad of other architectures.

It is also important to note that the parts of the flow diagram in the FIG. 6 illustrate only some of the possible scenarios that may be executed by, or within, the components shown (e.g., in FIGS. 1-5, and 7) and described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the components shown and described herein, in that any suitable arrangements, chronologies, configurations, and timing mechanisms may be provided without departing from the teachings of the present disclosure.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the FIGURES, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically herein to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

One or more advantages mentioned herein does not in any way suggest that any one of the embodiments necessarily provides all the described advantages or that all the embodiments of the present disclosure necessarily provide any one of the described advantages.

What is claimed is:

1. A method comprising:
provisioning, at a serverless computing system, a queue based on a representation of possible paths of a virtualized network function (VNF) forwarding model;
instantiating, by the provisioner at the serverless computing system, a serverless computing function based on the representation; and
processing, by the serverless computing system using the queue and the serverless computing function, one or more data packets traversing a network path associated with the queue, the processing including executing the serverless computing function, wherein the executed serverless computing function processes network data associated with the data packets.

2. The method of claim 1, wherein the serverless computing function writes outgoing messages to at least one queue.

3. The method of claim 1, wherein the queue stores a stream of messages to which at least one or more serverless computing functions subscribe.

4. The method of claim 1, further comprising:
determining, by the serverless computing system, an implementation graph with edges and vertices based on a specification,
wherein, the specification species one or more network paths, and wherein edges and vertices represent the one or more network paths through one or more VNFs specified in the specification.

5. The method of claim 1, further comprising:
determining, by the serverless computing system, an implementation graph with edges and vertices based on a specification, wherein the specification includes one or more VNF descriptors, and wherein the one or more VNF descriptors specify scripts to be executed by provisioned functions.

6. The method of claim 1, wherein provisioning the serverless computing function includes:
provisioning a preamble for reading incoming messages from one or more queues associated with one or more incoming edges to a respective vertex;
provisioning logic corresponding to a respective VNF for the respective vertex; and
provisioning a postamble for writing outgoing messages to one or more queues associated with one or more outgoing edges from the respective vertex.

7. The method of claim 6, wherein the respective VNF differs between incoming messages originating from different queues.

8. A serverless computing system comprising:
at least one memory element; and
at least one processor coupled to the at least one memory element the at least one processor being configured to:
provision a queue based on a representation of possible paths of a virtualized network function (VNF) forwarding model;
provision a serverless computing function based on the representation; and
process, using the queue and the serverless computing function, one or more data packets traversing a network path associated with the queue.

9. The serverless computing system of claim 8, wherein the serverless computing function writes outgoing messages to at least one queue.

10. The serverless computing system of claim 8, wherein the queue stores a stream of messages to which at least one or more functions subscribe.

11. The serverless computing system of claim 8, the at least one processor being configured to:
determine an implementation graph with edges and vertices based on a specification, wherein the specification specifies one or more network paths, and wherein the edges and vertices represent the one or more network paths through one or more VNFs specified in the specification.

12. The serverless computing system of claim 8, the at least one processor being configured to:
determine an implementation graph with edges and vertices based on a specification, wherein the specification includes one or more VNF descriptors, and wherein the one or more VNF descriptors specify scripts to be executed by provisioned functions, the provisioned functions comprising the serverless computing function.

13. The serverless computing system of claim 8, the at least one processor being configured to:
provision the serverless computing function for a respective vertex by:
provisioning a preamble for reading incoming messages from one or more queues associated with one or more incoming edges to the respective vertex,
provisioning logic corresponding to a virtualized network function for the respective vertex, and
provisioning a postamble for writing outgoing messages to one or more queues associated with one or more outgoing edges from the respective vertex.

14. The serverless computing system of claim 13, wherein the virtualized network function differs between incoming messages originating from different queues.

15. One or more computer-readable non-transitory media comprising one or more instructions that, when executed on one or more processors cause the one or more processors to perform one or more operations comprising:
provisioning, by a serverless computing system, a queue based on a representation of possible paths of a virtualized network function (VNF) forwarding model;
provisioning, by the serverless computing system, a serverless computing function based on the representation; and
processing, using the queue and serverless computing function, one or more data packets traversing a network path associated with the queue.

16. The one or more computer-readable non-transitory media of claim 15, wherein the serverless computing function writes outgoing messages to at least one queue.

17. The one or more computer-readable non-transitory media of claim 15, wherein the queue stores a stream of messages to which at least one or more functions subscribe.

18. The one or more computer-readable non-transitory media of claim 15, comprising instructions that, when executed by the one or more processors, cause the one or more processors to perform one or more operations comprising:
determining, by the serverless computing system, an implementation graph comprising edges and vertices based on a specification, wherein the specification specifies one or more network paths, and wherein the edges and vertices represent the one or more network paths through one or more VNFs specified in the specification.

19. The one or more computer-readable non-transitory media of claim 15, comprising instructions that, when executed by the one or more processors, cause the one or more processors to perform one or more operations comprising:
determining, by the serverless computing system, an implementation graph comprising edges and vertices based on a specification, wherein the specification includes one or more VNF descriptors, and wherein the one or more VNF descriptors specify scripts to be executed by provisioned functions.

20. The one or more computer-readable non-transitory media of claim 15, comprising instructions that, when executed by the one or more processors, cause the one or more processors to perform one or more operations comprising:
provisioning the serverless computing function for a respective vertex by:
provisioning a preamble for reading incoming messages from one or more queues associated with one or more incoming edges to the respective vertex,
provisioning logic corresponding to a VNF for the respective vertex, and
provisioning a postamble for writing outgoing messages to one or more queues associated with one or more outgoing edges from the respective vertex.

* * * * *